United States Patent [19]

Svitak

[11] Patent Number: 4,921,262
[45] Date of Patent: May 1, 1990

[54] CARRIAGES INCORPORATING VERTICALLY ADJUSTABLE WHEEL ASSEMBLIES

[76] Inventor: Paul W. Svitak, 6635 Minnesota Ave., Long Beach, Calif. 90805

[21] Appl. No.: 240,825

[22] Filed: Sep. 6, 1988

[51] Int. Cl.⁵ .............................................. B62D 33/08
[52] U.S. Cl. .............................. 280/43.23; 280/43.17; 172/407
[58] Field of Search ...................... 280/704, 43.17, 43.2, 280/43.21, 43.23, 43.24, 43, 43.18, 43.22; 180/24.02, 209; 172/407, 418, 423

[56] References Cited

U.S. PATENT DOCUMENTS

| | | | |
|---|---|---|---|
| 2,707,857 | 5/1955 | Bobrowski | 280/43.17 |
| 2,784,424 | 3/1957 | Southerland | 280/43.23 |
| 3,286,657 | 11/1966 | Browne | 280/704 X |
| 3,829,116 | 8/1974 | Burdick | 280/43.23 |
| 3,972,544 | 8/1976 | Soot | 280/704 |
| 4,513,984 | 4/1985 | Wright | 280/43.23 |

FOREIGN PATENT DOCUMENTS 983065  2/1976  Canada .............................. 280/43.17

OTHER PUBLICATIONS

The New Unique-Recreational Vehicle-, Samsonette Boats "n" Home, Long Beach, Ca.

Primary Examiner—Charles A. Marmor
Assistant Examiner—Brian L. Johnson
Attorney, Agent, or Firm—Dowell & Dowell

[57] ABSTRACT

Carriages for use in transporting a variety of vehicles and which include dual wheel and suspension members which are selectively raised and lowered by actuators through linkages, bearings and guide members which continuously stabilize the wheels and suspension members against longitudinal and laterally applied forces so as to distribute forces from the wheels to the carriage frames and wherein locks and stops are provided for limiting the retraction and/or extension of the wheels to retain the wheels in either a fully or partially retracted or fully extended positions.

24 Claims, 3 Drawing Sheets

CARRIAGES INCORPORATING VERTICALLY ADJUSTABLE WHEEL ASSEMBLIES

BACKGROUND OF THE INVENTION

1. Field of the Invention

This invention relates to carriages which incorporate wheel assemblies and especially to carriages to transport trailers, mobile homes, watercraft and other like structures and which provide for the safe, easy, and economical transport of such vehicles from one point to another and which are thereafter operable to lower and/or safely level and position such vehicles onto supporting surfaces or structures for a wide variety of placement functions.

2. Description of the Related Art

Many, if not most prior art carriages or wheel assemblies for use with mobile vehicles are manufactured using rigid and permanently installed assemblies which consist of welded or riveted members to which are attached springs, axles, spindles, hubs and wheels. Also many mobile homes are towed or transported only once and then placed on foundation structures and therefore seldom, if ever, need expensive springs, hubs and wheels. The positioning of vehicles such as mobile homes onto foundations involves jacking and lowering of the vehicles often on uneven and unstable terrain and possibly under unpredictable wind and other conditions thus requiring highly qualified personnel and extra equipment to insure safe placement of the vehicles. Personnel and equipment under such conditions are subject to danger and possible injury and damage. Individuals who use trailers and smaller lighter vehicles require the same equipment and care while leveling and placing their vehicles. Smaller lighter vehicles are often provided with the accessory leveling devices most of which are expensive and permanently installed and are vulnerable to damage from side loads. Such devices or accessories generally serve no purpose after the vehicle has been properly placed. Many portable jacks for leveling must be precariously blocked up and must be transported from one location to another, inventoried and maintained and are generally for limited use.

Individuals operating pontoon boats and other watercraft use specialized trailers to launch and recover such vehicles. After launching, an individual must locate a place to park and store their trailer, which on busy holiday weekends, may be a task of formidable proportions. When an individual choses to recover such watercraft, he or she must return or travel to an improved facility to lift the craft from the water. Positioning of trailers and positioning of watercraft on the trailers often requires considerable maneuvering. Further, if less than ideal winds and currents exist, after positioning the watercraft must be secured to prevent any movement or shifting during transportation.

Many of the carriages or wheel assemblies used to transport watercraft and other vehicles include a straight axle and therefore to accommodate weights imposed thereon often includes tandem axles. Tandem axles tend to grab on uneven road surfaces, rub and scuff when turns are made and thus resist and restrict such turns making maneuverability difficult, particularly in confined areas. Most individuals, therefore, find it desirable to use carriages which are more stable and maneuverable during use while simultaneously providing for ease of leveling, positioning, launching, and recovering as well as a wide variety of other functions.

SUMMARY OF THE INVENTION

The present invention provides mobile carriages that may be used on a plurality of vehicles and which can be reinstalled from one vehicle to another so as to enable transport from point to point of a variety of vehicles with the carriage assembly being adapted to level and position the vehicles utilizing retracting and extending linkages which are associated therewith which safely and easily manipulate the vehicles onto foundations or alternatively lift the vehicles for transport from foundations or the water to relocate such vehicles as is necessary without the need of highly trained and qualified personnel and without the use of auxiliary tools and devices.

In addition, the present invention provides mobile carriages that are more stable during transport than carriages or wheel assemblies here before available and which are capable of supporting more weight due to a better weight distribution and which are more maneuverable and provide weight control which is based upon the center of gravity of the vehicle. The present invention also controls the overall height of the vehicle so that vehicles can be maneuvered in confined areas with the wheels of the carriages being partially retracted. The carriages of the present invention may be used to launch watercraft utilizing wheels and suspension elements that may be retracted to reduce drag and limit the immension of such elements or lowered for recovery or beaching as an individual may chose in the interest of convenience and/or safety. In the event of danger or foul weather, the carriages eliminate the need for an auxiliary trailers that could require separate storage and which would otherwise have no function other than for point-to-point transportation.

BRIEF DESCRIPTION OF THE DRAWINGS

Further objects and advantages of the invention will be understood from a consideration of the following description of the accompanying drawings in which.

DESCRIPTION OF THE PREFERRED EMBODIMENT

Figure 1:
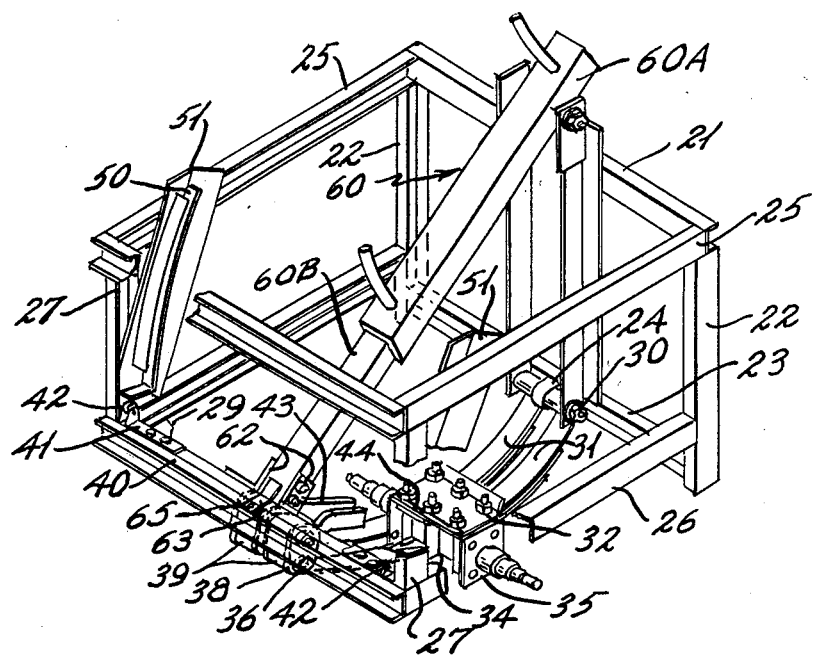
FIG. 1 is a perspective elevational view of a carriage according to the invention.

FIG. 1 shows the frame of the carriage assembly according to the preferred embodiment of the present invention which frame is constructed of steel channel, angle, tubing or other materials such as aluminum or metal composites which are acceptable and which will equal or exceed minimum strength requirements. The main frame can be square or rectangular with the strength varied depending upon the desired use. The front of the frame includes an actuating tower defined by a pair of spaced plates 20 which are connected adjacent their upper ends to an upper front frame element 21A and adjacent their lower ends to lower front frame element 23. Frame elements 21A and 23 are connected at their ends to a pair of spaced vertical frame elements 22. The upper and lower and vertical front frame elements 21A, 23 and 22 comprise the front section of the main frame. The upper and lower frame elements 21A and 23 are connected to upper and lower side frame elements 25 and 26. The side frame elements are connected at their remote or rear ends to rear upper and lower cross frame elements 21B and 28 and to the rear vertical frame elements 27 thereby completing the main frame structure. The elements of the main frame are connected in the manner shown so that all loads and shocks are distributed throughout the frame elements.

Figure 3:
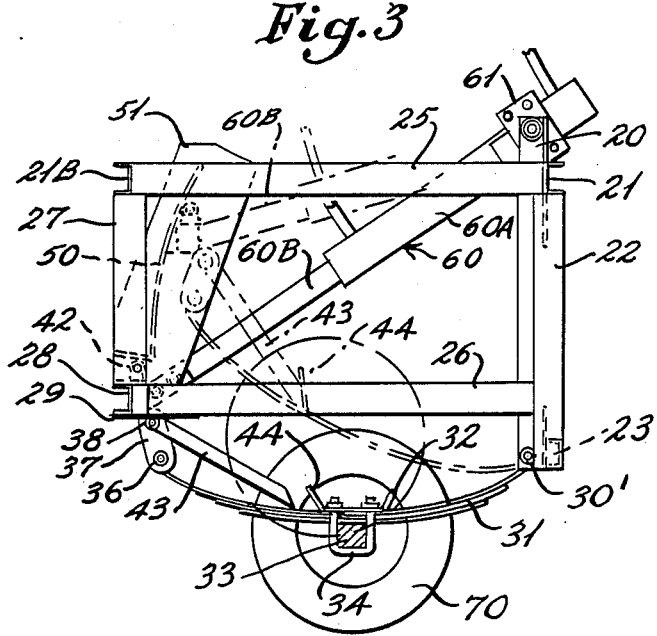
FIG. 3 is a right side view of the carriage of FIG. 2 in a down and locked position showing in dotted line the unlocked and partially retracted position.

A pair of suspension springs 31 are connected to the lower portions of the spaced plates 20 of the actuating tower by way of a front spring hanger 24 and a spring hinge bolt 30. The suspension springs are connected by mounting plate 32 having three U-bolts disposed therethrough. The U-bolts also secure a dual set of wheels 70 to the suspension rings by engaging an axle spindle assembly 33 to the central portion of the suspension springs. The spindle assembly is further connected to the brake flange 35. The rear ends of the suspension springs are connected by a rear spring bolt 36 to an over center locking lever 37 as is best seen in FIG. 3. The locking lever is also connected at the upper end to eye plates 39 by way of upper control bolts 38. The bolts utilized to connect the suspension spring to the frame may include grade 8 bolts, 9/16" diameter by 6" long.

Figure 6:
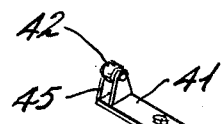
FIG. 6 is a partial perspective view of the positive down lock carrier of the present invention.
Figure 7:
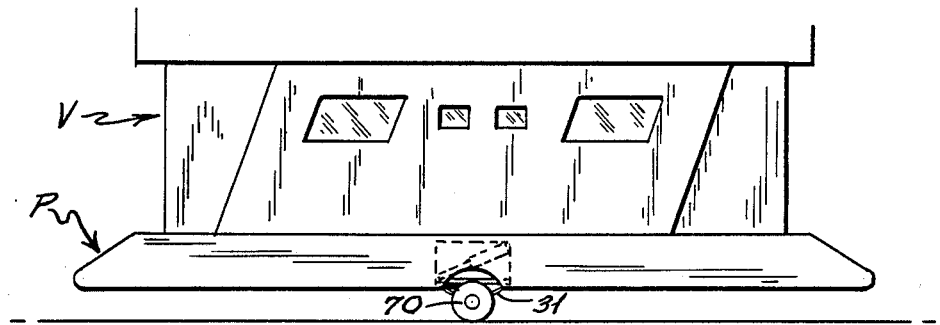
FIG. 7 is a side illustrational view of a conventional vehicle showing the wheels of the carriage assembly in a down and locked position for transport.

The pair of eye plates 39 are connected to the front surface of a positive down lock carrier beam 40 as is best seen in FIG. 6. A pair of load control bearing supports 41 are mounted adjacent each side of the positive down lock carrier beam with each support carrying a positive load control bearing or roller 42. Also connected to the upper portion of the over center locking lever 37 is a travel limit linkage arm 43 which is connected to the lever through the eye plate 39 and bolt 38. A pair of corner down travel stop platforms 29 are connected to the rear lower frame element 28 and the side frame elements 25 for purposes which will be described in greater detail hereinafter.

In order to guide the suspension spring assembly 31 as it is raised by the pivotable action of the over center locking lever 37, in a manner which will be described in greater detail hereinafter, a pair of vertically extending side load resisting flanges or plates 51 are provided along either side of the main frame and are secured to the frame elements 25 and 26 and rear vertical frame elements 27. The side load resisting plates may also be secured at their lower ends to the rear lower cross frame element 28. A pair of arcuately shaped bearing guide tracks 50 are mounted to each of the side load resisting plates 51 so as to extend upwardly from adjacent the rear lower cross frame element 28 to adjacent the upper side frame elements 25. The positive load control bearings 42 are designed to ride along the arcuate tracks 51 as the suspension spring assembly is raised as shown in dotted line in FIG. 3. The lower portion of each track includes a horizontal face 50 which is designed to permit the bearing 42 to be released from engagement with the track when the suspension spring is in a down and locked position as shown in full line in FIG. 3.

Figure 5:
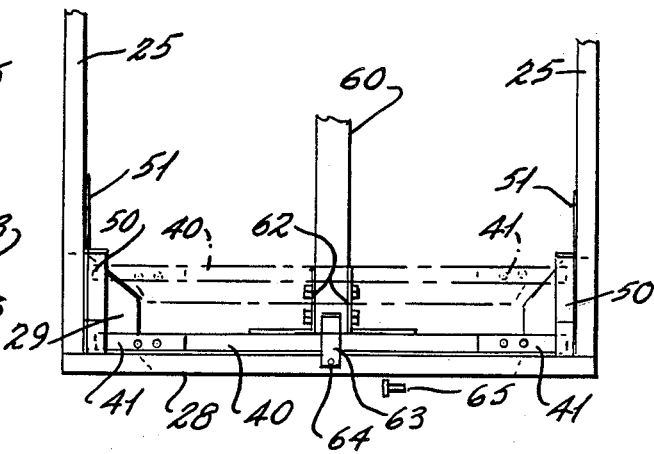
FIG. 5 is a partial top plan view of the locking mechanism shown in a down and locked position with the unlocked position shown in dotted line.

Actuation of the suspension spring and the attached axle spindle assembly 33 is accomplished by utilizing an actuator 60 which is connected to the positive down lock carrier beam 40 by a pair of opposing bracket members 62. As is best shown in FIG. 5, a manual down lock safety pin receiving hole 64 is applied through a locking plate 63 and the rear lower frame element 28. The opening or hole 64 is provided to accept a safety pin 65 which serves to manually lock the lower end of the actuator 60 to the positive down lock carrier beam 40. To prevent inadvertent retraction of the safety pin 65, the actuator 60 is also connected to the spaced vertical plates 20 of the front actuator tower by an actuator control yoke frame 61. As is shown in FIG. 1, the actuator 60 may take various forms and may be manually, hydraulically, pneumatically or electrically operated but is shown as including a hydraulic cylinder housing 60A in which is extendable a piston rod 60B. Hydraulic fluid is applied to the cylinder housing 60A by means of a pair of hydraulic lines 80 and 81 which are connected to a suitable source of hydraulic fluid under pressure.

Figure 2:
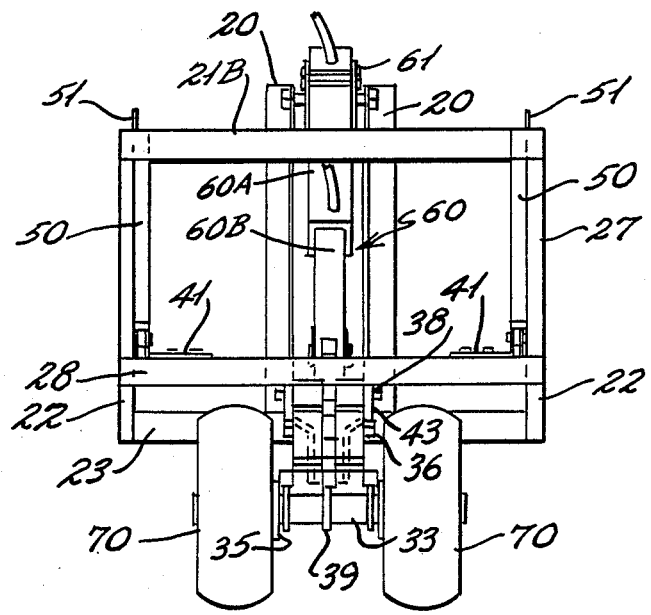
FIG. 2 is a rear plan view of a carriage with the wheels in a down locked position.

In using the carriage assemblies of the present invention, the carriage of FIG. 2 may be installed to the left and right sides of a vehicle so as to be at a point in line with the center of gravity or mass thereof. After a pair of carriage assemblies has been installed, they may be used to perform a wide variety of transportation and other functions including leveling, raising and lowering a vehicle, and positioning a vehicle on foundation support devices. The wheels of the carriage assemblies may be selectively raised so that the wheels may be stored in a sheltered configuration or compactly disposed so that the carriage assemblies may be removed as necessary.

Figure 4:
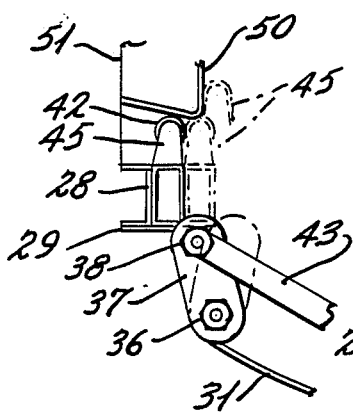
FIG. 4 is an enlarged partial side view of the over center locking elements and linkages when in a down locked position with the unlocked position being shown in dotted line.

To raise the wheels of the carriage assemblies to thereby lower a vehicle to a proper level, the safety pin 65 is removed from the positive down lock carrier beam 40 and thereafter the hydraulic cylinder 60A is activated to retract or shorten the piston rod 60B. As the piston rod is retracted, the positive down lock carrier beam 40 moves forward until the top of the bottom flange thereof moves forward of the bottom face of the rear lower cross frame element 28 as is best shown in FIG. 5. The forward travel of the beam 40 rotates the over center locking lever 37 about bolt 36 as shown in FIG. 4. After the beam 40 moves forward of the rear lower cross frame element 28, the bearings 42 will engage in track 50 thereby guiding the suspension springs 31 and wheels 70 to be raised by the actuator 60. Retraction continues until interrupted by the operator or until the piston rod 60B is fully retracted thereby raising the wheels from the down and locked position to the raised level as seen in dotted line in FIG. 3.

To extend the wheels and raise the vehicle, the hydraulic cylinder 60A is actuated to extend piston rod 60B thereby applying force to the beam 40 and moving the suspension springs and wheels in a downward arc as the bearings 42 follow the track 50 until the beam 40 impacts against the down travel stop platforms 29. The downward travel of the beam 40 is positively stopped by the platforms 29 and thereafter the beam 40 slides to the rear along the platforms during which the beam is partially controlled by contact of the bearings 42 with the bottom portion of the track 50 as is shown in FIG. 4. The over centering locking lever 37 is rotated about bolt 36 until the top surface of the bottom flange of the beam 40 slides under the bottom surface of the rear lower cross frame element 28 as is shown in FIGS. 4 and 5. As the bottom flange of the beam 40 moves under the bottom face of the frame element 28, all the load is now engaged by the beam so that all weight forces and shocks are transferred from the wheels 70 through the springs 31 to the full width of the beam 40 and frame element 28 thereby effectively transferring loads to the vehicle via the frame. As the locking lever 37 moves over center, as shown in FIG. 4, the beam 40 and the locking lever 37 act against the frame element 28 and are restrained from further down travel by the platforms 29. These elements are now in the positive over center down and locked position. In this position, the actuator 60 is also in a position urging the beam 40 against the frame element 28 and thus providing additional locking of the wheels so as to further enhance safety by preventing inadvertent unlocking of the carriage elements. Should a failure of the actuator 60 occur, any reaction to move the beam 40 toward an unlocked or collapsed condition would be prevented by the locking pin 65 which is selectively engaged in the opening 64 locking the beam 40 to the frame. These features plus the contact of the rear vertical face of the beam 40 with the front vertical face of the frame element 28 positively locks and rigidifies the carriage wheels and also distributes weight and shocks to the carriage frame.

Further benefits are provided by the invention when leveling is required on uneven terrain. When retraction begins, if any side load is encountered by the beam 40 which would tend to shift the vehicle to either the left or the right, the force so applied will be countered by the bearing supports engaging the contact plates 51 as seen in FIG. 5 thereby preventing any side motion. To reduce friction, bearings, not shown, may be installed on the ends of the bearing supports so as to engage the contact plates 51. Bearings thus installed would contact and roll on the plate 51 thereby relieving frictional loads.

A further safety feature of the invention, not shown, is that holes may be drilled at selective intervals in the face of the contact plates 51 adjacent the guide tracks 50 through which safety pins or bolts could be selectively positioned to prevent accidental collapse of the carriage assembly at any given adjusted position. Proper application of this embodiment of the invention would require that safety pins be installed at the final position of travel such as when the vehicle is lowered to rest on a foundation or other support structure. Engaging the pin slightly above the intended reference point would enable the wheels to be retracted enough to clear terrain for storage or removal at an individual's discretion or as needed and thereafter insure against collapse of the wheels at a point beyond the intended travel thereof.

Figure 8:
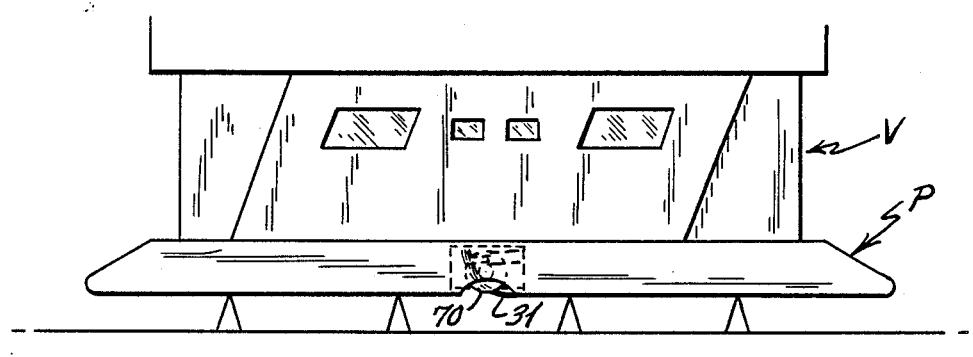
FIG. 8 is a side illustrational view of the vehicle of FIG. 7 showing the wheels of the carriage assembly of the present invention retracted thereby allowing the vehicle to rest upon support devices or so as to be deployed in the water as desired.

As the wheel assemblies of the present invention are raised such as when placing a vehicle V on a foundation such as shown in FIG. 8, positive loads will be removed from the beam 40 and bearings 42 which are guided in the tracks 50 and also will be removed from the actuator 60 so that such elements are in a negative load condition. As the actuator 60 is pulling instead of pushing on beam 40 as the wheels are raised, the negative load attempts to move the locking lever 37 past a normal position. To prevent this over travel, the travel limiter linkage 43 impacts against stop 44 mounted to the mounting plate 32 as is shown in dotted line in FIG. 3. When this occurs, additional movement of the lever 37 is prevent and the suspension springs 31, lever 37 and the beam 40 are rigid and pivot about hinge 30 allowing the actuator to retract and raise the wheels 70. Once the wheels are raised and the vehicle position on a support structure, the carriage may be removed or alternatively remained installed so that the wheels may be lowered as desired to raise the vehicle for subsequent transport. At any time during the extension of the wheels, a positive load or force W is introduced within the carriage assembly. For example, when the wheels contact a solid surface, a positive load is imposed as the actuator 60 moves beam 40 rearwardly a fraction of an inch so that the bearings 42 contacting in track 50 will prevent over travel of the beam 40. The carriage linkages will extend down and lock when the beam 40 contacts the platforms 29 and frame element 28.

Users of vehicles such as boats having pontoons P and other watercraft can install the carriage assemblies preferably, but not necessarily, in compartments provided in the pontoons. In this manner, the boats can be towed to a launch facility or acceptable beach. The carriage assemblies will permit the boats to be launched and thereafter the wheels raised to reduce drag while the boats are in the water. When it is desired to remove a craft from the water, the wheels may be lowered as desired and the vehicle removed at any suitable facility, beach or river bank. The carriages of the present invention also increase safety in case of violent storms. In such cases as severe winds and under severe wave conditions, the wheel assemblies of the carriages may be lowered to thereby act as stabilizers while the boats or watercraft are in the water thereby improving handling of such craft under such severe conditions. Again, when it is desired to remove such craft from the water, it is a simple matter to move the craft to a point of recovery at which point the wheels are extended to a down locked condition and thereafter the boat pulled from the water.

The carriage assemblies of the present invention thereby permit watercraft to be moved from point to point and transported through unimproved areas with the wheel assemblies permitting the craft to be launched at sites such as shallow sloping beaches or river banks that are not provided with improved launch facilities. Further, individuals may recover watercraft and proceed on any reasonable or level terrain and not necessarily along improved roads. The dual wheels of the present invention distribute loads over a larger area than single axle carriages and thus provide means for stabilizing vehicles when being portaged around rapids, shallow water and other hazards. In some terrain, it may also be possible to install additional carriage assemblies to thereby provide additional support for a given vehicle.

Individuals operating large mobile homes will appreciate the economy, safety and ease of operation of the carriages of the present invention especially when attempting to locate double or triple wide units. In order to enable multiple units to be brought together in assembled relationship at a proper position and level, the carriages may be installed at right angles to their normal placement thereby enabling the vehicles or units to be shifted laterally with respect to their normal forward or rearward movement. Also, as a modification which is not shown, separate mounts with directional controls may be coupled to the top of the carriage frames so that the frames may be installed to the sides of vehicles or other units so that such vehicles or units may be shifted in any desired direction when the wheels of the carriages are in a fully extended and down locked position.

In some instances, individuals transporting mobile homes or apartment structures may find it advantageous to attach the carriage assemblies of the present invention to the outside walls of such structures thereby providing means to raise structures from existing foundations as is necessary. After raising such structures, the structures may be transported to a selected location using only the carriages for mobile support.

Individuals utilizing the carriages of the present invention will also benefit from the spring, dual spindle and dual wheel embodiments of the invention. Utilizing the dual wheel embodiments, wheels and tires can be removed and replaced with ease as necessary. To change a wheel, an individual moves the carriage onto a 4×6 or other wood beam support so that the wheel that is to remain on the axle is on the support with the wheel to be removed clear of the adjacent surface. The wheel to be removed can thereafter be safely and easily removed without the use of accessory jacks. Another benefit that will be enjoyed by individuals utilizing the carriage assemblies of the present invention is that in the invent of a flat tire, the remaining tire of the dual tires associated with each carriage will permit the vehicles supported by the carriages to be moved to a safer location wherein the required tire repair can be accomplished with safety.

Those skilled in the art will invision other possible variations of the carriage assemblies which fall within the scope of the present invention. The dimensions, shapes, manufacturing procedures and materials of the carriage assemblies of the present invention may be altered to vary the strengths and maximum gross weight limits which may be safely handled utilizing the carriages. Further, the exact positioning of the actuator 60 may be varied so as to redirect the load or force W which is associated with and transmitted to the carriage from the wheels as they engage a support surface. Further, additional state of the art suspension systems such as air cushions, air oil struts or rubber donut type devices may be utilized in the carriage assemblies of the present invention. Also, the hydraulic actuator 60 may be replaced by a manual or pneumatic or electro mechanical actuator or combinations thereof.

I claim:

1. A carriage for transporting and raising and lowering vehicles comprising, a frame having upper and lower first and second end frame elements and spaced side elements, a wheel assembly, suspension means for pivotally connecting said wheel assembly to said frame, said suspension means having first and second ends, bearing means, means for connecting said bearing means to said second end of said suspension means, track means mounted to said frame, actuator means mounted to said frame, said actuator means being connected to said means for connecting said bearing means to said second end of said suspension means, said bearing means being selectively moveable along said track means by said actuator means so as to selectively raise or lower said wheel assembly with respect to said frame between a raised position within said frame and a lower position wherein said wheel assembly is extended from said frame.

2. The carriage of claim 1 in which said means for connecting said bearing means to said second end of said suspension means includes a lever means having first and second ends, first connector means for pivotally connecting said second end of said lever means to said second end of said suspension means, a beam member, second connector means for connecting said first end of said lever means to said beam member, said beam member having opposite ends, one of said bearing means carried by each of said ends of said beam member.

3. The carriage of claim 2 wherein said beam member is engageable with said lower second end frame element when said wheel assembly is in said lowered position.

4. The carriage of claim 3 including platform means mounted adjacent said lower second end frame element of said frame and in spaced relationship to said track means whereby said platform means limits the displacement of said beam member relative to said track means.

5. The carriage of claim 4 including a pair of spaced contact plates mounted to said frame, said contact plates extending along the length of and proximate to said track means so as to limit any transverse motion of said beam member as said bearing means moves along said track means.

6. The carriage of claim 5 including a travel limiter linkage means connected to said first end of said lever means, stop means carried by said suspension means, said travel limiter linkage means engaging said stop means when said wheel assembly is moved to said raised position to thereby prevent the further pivoting of said lever means and lock said wheel assembly in said raised position.

7. The carriage of claim 6 including a locking pin means for selectively locking said beam member to said lower second end frame element when said wheel assembly is in said lower position.

8. The carriage of claim 7 in which said wheel assembly includes an axle means, and a pair of wheels mounted to said axle means.

9. The carriage of claim 8 in which said suspension means includes an elongated suspension spring means having first and second ends, said first end being pivotally mounted to said lower first end frame element and support means for securing said axle means to said suspension spring means.

10. The carriage of claim 9 in which said actuator means includes first and second end portions, said first end portion being connected adjacent said upper first end frame element and said second end being secured to said beam member.

11. The carriage of claim 1 including contact plate means mounted to said frame, said contact plate means extending along the length of said track means so as to limit any transverse motion of said suspension means as said bearing means travel said track means.

12. The carriage of claim 1 including platform means mounted adjacent said lower second end frame element and in spaced relationship to said track means whereby said platform means limits the displacement of said bearing means relative to said track means.

13. The carriage of claim 1 in which said wheel assembly includes an axle means, and a pair of wheel means carried by said axle means.

14. The carriage of claim 1 in which said means for connecting said bearing means to said second end of said suspension means includes lever means having first and second ends, said second end of said lever means being pivotedly connected to said second end of said suspension means, a beam member, said first end of said lever means being connected to said beam member, said beam member having opposite ends, one of said bearing means carried by each of said ends of said beam member, a travel limiter linkage means connected to said first end of said lever means, stop means carried by said suspension means, said travel limiter linkage means engaging said stop means when said wheel assembly is moved to said raised position to thereby prevent the further pivoting of said lever means and thereby lock said wheel assembly in said raised position.

15. The carriage of claim 14 including a locking pin means for selectively locking said beam member to said lower second end frame element when said wheel assembly is in said lowered position.

16. A carriage for transporting and raising and lowering vehicles comprising, a frame having end spaced frame elements, a wheel assembly, suspension means for pivotally connecting said wheel assembly to said frame, said suspension means having first and second ends, a beam member, means for connecting said beam member to said second end of said suspension means, guide means mounted to said frame, actuator means mounted to said frame, said actuator means being connected to said beam member, said beam member being selectively moveable along said guide means by said actuator means so as to selectively raise or lower said wheel assembly with respect to said frame between a raised position within said frame and a lower position wherein said wheel assembly is extended from said frame.

17. The carriage of claim 16 including bearing means carried by said beam member, said bearing means being engageable with said guide means.

18. The carriage of claim 17 in which said means for connecting said beam member to said second end of said suspension means includes a lever means having first and second ends, first connector means for pivotally connecting said second end of said lever means to said second end of said suspension means, second connector means for connecting said first end of said lever means to said beam member, said beam member having opposite ends, one of said bearing means carried by each of said ends of said beam member.

19. The carriage of claim 18 wherein said beam member is engageable with one of said frame elements when said wheel assembly is in said lowered position.

20. The carriage of claim 19 including platform means mounted adjacent said one of said frame elements and in spaced relationship to said guide means whereby said platform means limits the displacement of said beam member relative to said guide means.

21. The carriage of claim 20 including a locking pin means for selectively locking said beam member to said one of said frame elements when said wheel assembly is in said lower position.

22. The carriage of claim 18 including a pair of spaced contact plates mounted to said frame, said contact plates extending along the length of and proximate to said guide means so as to limit any transverse motion of said beam member as said bearing means moves along said guide means.

23. The carriage of claim 18 including a travel limiter linkage means connected to said first end of said lever means, stop means carried by said suspension means, said travel limiter linkage means engaging said stop means when said wheel assembly is moved to said raised position to thereby prevent the further pivoting of said lever means and lock said wheel assembly in said raised position.

24. The carriage of claim 16 in which said wheel assembly includes an axle means, and a pair of wheels mounted to said axle means.

* * * * *